United States Patent
Del Pozo Gonzalez et al.

(10) Patent No.: US 10,124,745 B2
(45) Date of Patent: Nov. 13, 2018

(54) JOINING ARRANGEMENT AND METHOD WITH MOLDED STAKE AND APERTURE

(71) Applicant: GM GLOBAL TECHNOLOGY OPERATIONS LLC, Detroit, MI (US)

(72) Inventors: Luis Miguel Miguel Del Pozo Gonzalez, Zinacantepec (MX); Xavier Jesus Del Rio Aspra, Metepec (MX)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 20 days.

(21) Appl. No.: 15/399,912

(22) Filed: Jan. 6, 2017

(65) Prior Publication Data
US 2018/0194299 A1   Jul. 12, 2018

(51) Int. Cl.
*B60R 11/06*   (2006.01)
*B60R 13/02*   (2006.01)
*F16B 5/06*    (2006.01)

(52) U.S. Cl.
CPC ........ *B60R 13/0206* (2013.01); *F16B 5/0642* (2013.01)

(58) Field of Classification Search
CPC . H01L 2924/00014; H01L 2924/00012; H01L 2224/48227; H01L 2924/00; G09F 3/204; B29C 66/71; B29C 65/00; B29L 2031/772; B29K 2023/12; F25D 2325/022
USPC ...................................................... 296/37.1
See application file for complete search history.

(56) References Cited

U.S. PATENT DOCUMENTS

| | | | | |
|---|---|---|---|---|
| 4,817,264 A | * | 4/1989 | Worthing | F16B 5/01 29/512 |
| 4,888,451 A | * | 12/1989 | Toni | B64D 45/02 174/2 |
| 4,998,938 A | * | 3/1991 | Ghajar | A61B 90/11 285/206 |
| 5,783,815 A | * | 7/1998 | Ikeda | H01L 27/14618 250/208.1 |
| 6,370,739 B1 | * | 4/2002 | Jakob | F16G 3/02 24/31 B |
| 7,695,480 B2 | * | 4/2010 | Solar | A61B 90/11 606/130 |
| 9,003,662 B2 | * | 4/2015 | Burd | F16B 5/01 29/897.2 |
| 9,752,319 B1 | * | 9/2017 | Levan | E04B 2/965 |
| 2002/0042605 A1 | * | 4/2002 | Castaneda | A61B 17/3417 606/1 |
| 2009/0188178 A1 | * | 7/2009 | Lucas | E04H 4/144 52/126.1 |

(Continued)

*Primary Examiner* — Kiran B Patel
(74) *Attorney, Agent, or Firm* — Lorenz & Kopf, LLP (57) ABSTRACT

Arrangements and methods are provided for joining. The joining arrangement includes a stake extending outward from a surface of a first substrate or panel. The stake includes a base portion, a first shelf portion, a second shelf portion, and a distal surface. The joining arrangement further includes an aperture formed in a second substrate or panel. The aperture includes a plurality of outwardly-extending, spaced-apart fingers that circumscribe a central opening. Each finger of the plurality of fingers is deformable outwardly to receive the stake. The joining arrangement finds use in vehicle trim assemblies. The joining method includes the step of inserting the stake of the first substrate or panel into the aperture of the second substrate or panel.

20 Claims, 12 Drawing Sheets

(56) References Cited

U.S. PATENT DOCUMENTS

2014/0157699 A1* 6/2014 Moeller .................... E04B 2/88
　　　　　　　　　　　　　　　　　　　　52/235
2015/0084334 A1* 3/2015 Caruso .................. B65D 83/28
　　　　　　　　　　　　　　　　　　　　285/320
2017/0009793 A1* 1/2017 Mahoney ................. B21J 15/36

* cited by examiner

JOINING ARRANGEMENT AND METHOD WITH MOLDED STAKE AND APERTURE

INTRODUCTION

The present invention generally relates to joining arrangements and methods that may be used to join together articles of manufacture, such as vehicle components. More particularly, the present disclosure relates to a joining arrangement and method with a stake and an aperture for use in joining vehicle trim components to main trim panels.

It is known to provide an interior trim panel assembly for a vehicle to present an aesthetically pleasing appearance in an occupant compartment of the vehicle. The interior trim panel assembly may be a door trim panel assembly having a plurality of separate components with each component having a specific function. The components typically include an interior trim, sound absorber, water barrier, insert, armrest, and map pocket closeout and side impact blocks. The components are assembled together and attached to an interior trim substrate by several different conventional processes including heat staking and sonic welding. The interior trim panel assembly is then mounted to a panel such as an inner door panel of a door for the vehicle by suitable means such as fasteners.

The conventional processes of heat staking and sonic welding, however, suffer from several drawbacks. For example, heat staking and sonic welding cause plastic material transformations that may lead to plastic resin degradation due to induced voids, porosities, residual (frozen) stresses, weld lines, and cracks, negatively impacting the mechanical performance of the plastic material. The mechanical strength of the plastic material directly relates to the durability and robustness of the interior trim panel assembly.

Accordingly, it is desirable to provide joining arrangements and methods for vehicle trim assemblies that do not require the use of heat staking, sonic welding, or any other welding methods. In addition, it is desirable to provide such arrangements and methods that are economical to manufacture using conventional tooling. Furthermore, other desirable features and characteristics of the present invention will become apparent from the subsequent detailed description of the invention and the appended claims, taken in conjunction with the accompanying drawings and the background of the invention.

SUMMARY

A joining arrangement includes a stake extending outward from a surface of a first substrate or panel. The stake includes: (1) a base portion in physical contact with the first substrate or panel and extending outwardly from the surface of the first substrate or panel, the base portion having a first width, (2) a first shelf portion in physical contact with the base portion and extending outwardly from the base portion, the first shelf portion having a second width that is greater than the first width, the first shelf portion including a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion including a second, inward-facing annular surface adjacent to the first radial surface and a second, radially-facing radial surface adjacent to the second annular surface, and (4) a distal surface adjacent to and extending outwardly from the second annular surface of the second shelf portion. The joining arrangement further includes an aperture formed in a second substrate or panel. The aperture includes a plurality of spaced-apart fingers that circumscribe a central opening, wherein each finger of the plurality of fingers extends outwardly from a surface of the second substrate or panel, wherein each finger of the plurality of fingers includes an outer planar surface adjacent to the central opening, and wherein each finger of the plurality of fingers is deformable outwardly.

A method for joining a first substrate or panel with a second substrate or panel, includes the steps of, on the first substrate or panel, providing a stake extending outward from a surface of a first substrate or panel. The stake includes: (1) a base portion in physical contact with the first substrate or panel and extending outwardly from the surface of the first substrate or panel, the base portion having a first width, (2) a first shelf portion in physical contact with the base portion and extending outwardly from the base portion, the first shelf portion having a second width that is greater than the first width, the first shelf portion including a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion including a second, inward-facing annular surface adjacent to the first radial surface and a second, radially-facing radial surface adjacent to the second annular surface, and (4) a distal surface adjacent to and extending outwardly from the second annular surface of the second shelf portion. The method further includes, on the second substrate or panel, providing an aperture formed in a second substrate or panel. The aperture includes a plurality of spaced-apart fingers that circumscribe a central opening, wherein each finger of the plurality of fingers extends outwardly from a surface of the second substrate or panel, wherein each finger of the plurality of fingers includes an outer planar surface adjacent to the central opening, and wherein each finger of the plurality of fingers is deformable outwardly.

A vehicle trim assembly that employs a joining arrangement includes a trim component and a plurality of stakes extending outward from a surface of the trim component in a pattern. Each stake of the plurality of stakes includes: (1) a base portion in physical contact with the trim component and extending outwardly from the surface of the trim component, the base portion having a first width, (2) a first shelf portion in physical contact with the base portion and extending outwardly from the base portion, the first shelf portion having a second width that is greater than the first width, the first shelf portion including a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion including a second, inward-facing annular surface adjacent to the first radial surface and a second, radially-facing radial surface adjacent to the second annular surface, and (4) a distal surface adjacent to and extending outwardly from the second annular surface of the second shelf portion. The vehicle trim assembly further includes a trim panel substrate and a plurality of apertures formed in the trim panel substrate in the pattern, wherein each aperture of the plurality of apertures comprises a plurality of spaced-apart fingers that circumscribe a central opening, wherein each finger of the plurality of fingers extends outwardly from a surface of the trim panel substrate, wherein each finger of the plurality of fingers includes an outer planar surface adjacent to the central opening, and wherein each finger of the plurality of fingers is deformable outwardly. An outwardly extending height of the plurality of fingers is substantially the same as a height of the second shelf portion above the surface of the trim component. Further, each stake is inserted through a respective aperture such that the second annular surface of the second shelf portion of each stake is in physical abutting contact with the outer planar surfaces of the plurality of fingers of its respective aperture, such that the trim component is held in abutting physical contact with the trim panel substrate.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Figure 1:
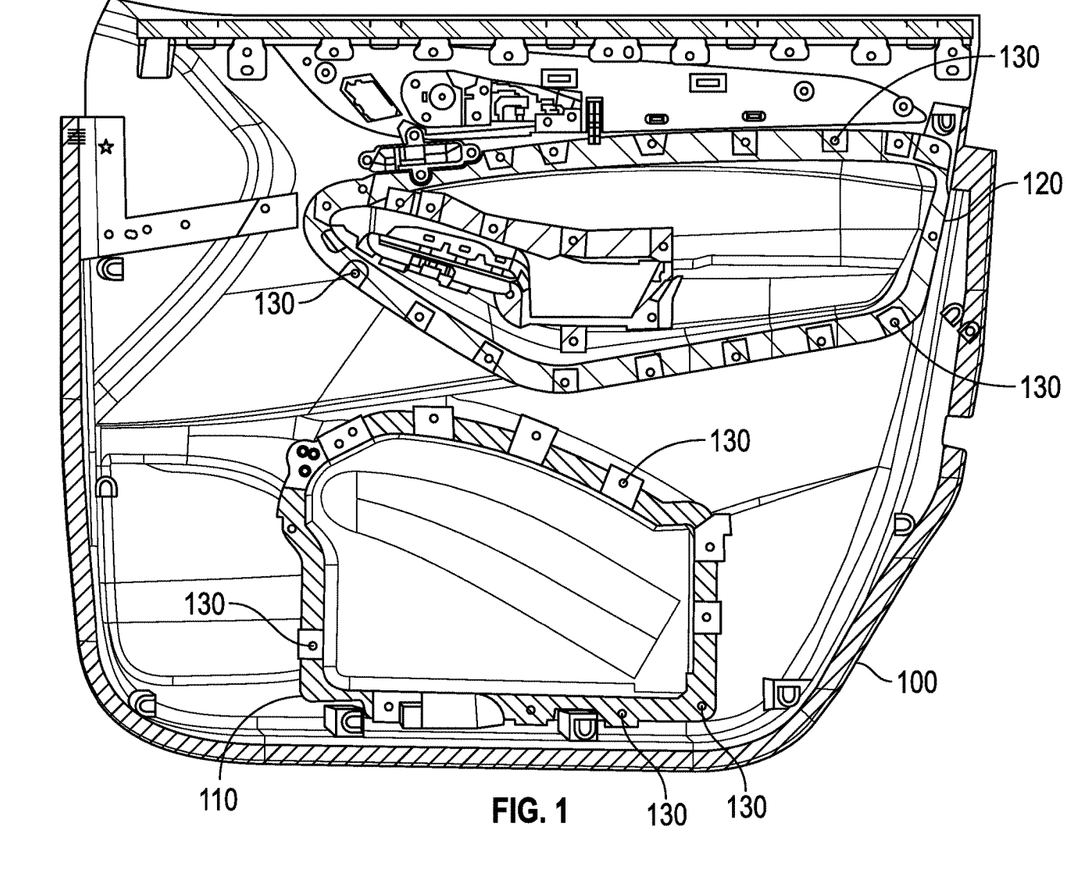
FIG. 1 illustrates an exemplary door trim panel for a door for a vehicle, without limitation as to the type of vehicle.

FIG. 1 illustrates an exemplary door trim panel 100 for a door for a vehicle. The door trim panel 100 may have physically coupled therewith (using fasteners and/or adhesives, for example) a plurality of trim panel substrates. For example, FIG. 1 illustrates a map pocket trim panel substrate 110 and an armrest trim panel substrate 120. Each of the plurality of trim panel substrates (for example 110, 120) include a plurality of apertures 130 for receiving the joining stakes (not shown) of an interior trim component. The apertures 130 and the joining stakes (whether or not the joining stake is received into the aperture 130) are hereinafter referred to in this disclosure as "joining arrangements." The number of these joining arrangements required for the plurality of trim panel substrates for a given inner door panel 100 varies greatly between particular applications, but often from 60 to 80 of these apertures 130 may be present, representing a significant tooling, material, and time investment in the manufacture of a vehicle.

Figure 2A:
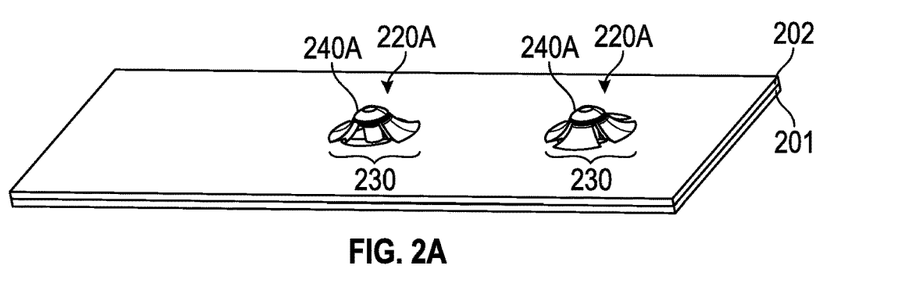
FIGS. 2A and 2B illustrate two different embodiments of joining arrangements suitable for use in connection with the door trim panel of FIG. 1.
Figure 2B:
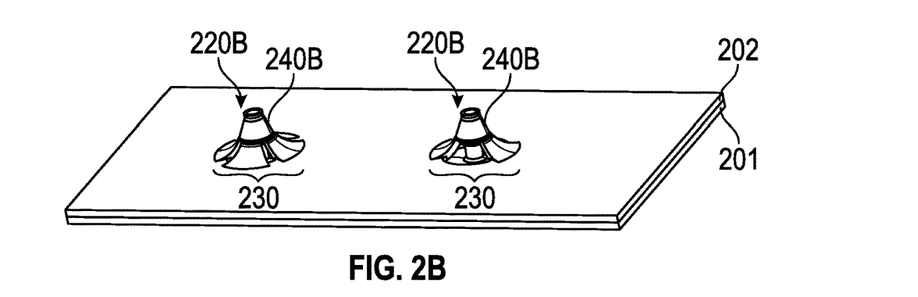
Figure 3A:
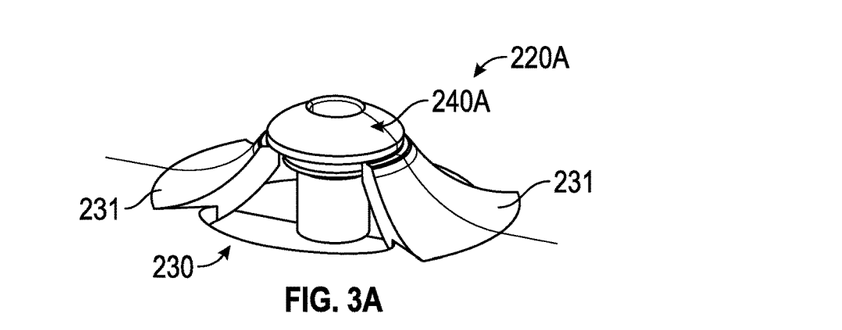
FIGS. 3A and 3B illustrate enlarged views of the joining arrangements of FIGS. 2A and 2B, respectively.
Figure 3B:
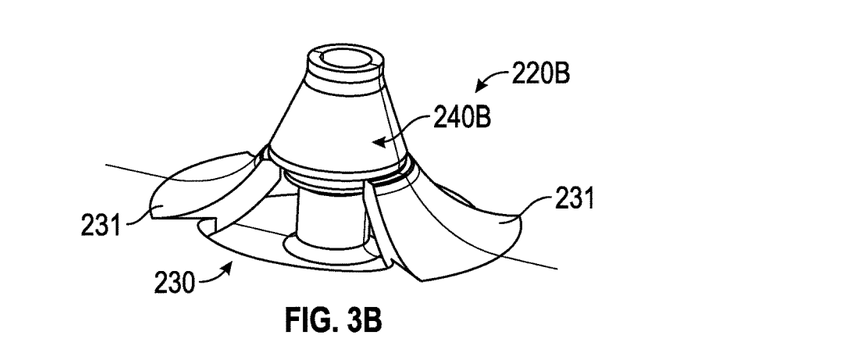

FIGS. 2A and 2B illustrate an interior trim component 201, a trim panel substrate 202, and two different embodiments of joining arrangements, namely joining arrangement 220A and joining arrangement 220B. FIGS. 3A and 3B illustrate enlarged views of the joining arrangements 220A, 220B, respectively, of FIGS. 2A, 2B. In both embodiments, the trim panel substrate 202 includes a plurality of apertures 230. The trim panel substrate could be provided as map pocket trim panel substrate 110, armrest trim panel substrate 120, or any other trim panel substrate that may for part of the door assembly of a vehicle. The apertures 230 could be provided as any of the plurality of apertures 130 shown in FIG. 1 for any trim panel substrate. The materials used to make the interior trim component 201 and the trim panel substrate 202 are any of the conventional vehicle interior materials, such as plastics.

The apertures 230 include a plurality of (often three, four, or more) outward-extending "fingers" 231 (the terms "inward" and "outward" will be used in this disclosure with respect to the occupant compartment of the vehicle; thus, any component described as extending "inward" extends toward the occupant compartment, and any component described as extending "outward" extends away from the occupant compartment, i.e., toward the exterior of the vehicle). For the joining arrangement 220A, the backside (outward-facing side) of the interior trim component 201 includes a dome-shaped molded stake 240A (the term "molded" as used herein is synonymous with "shaped," and is not intended to restrict the manufacture thereof to any particular method) that is configured to insert through an aperture 230, and abuttingly rest against the plurality of fingers 231 thereof. For the joining arrangement 220B, the backside of the interior trim component 201 includes a truncated cone-shaped molded stake 240B that is configured to insert through an aperture 230, and abuttingly rest against the plurality of fingers 231 thereof. The materials used to make the interior trim component 201 (including the molded stakes 240A, 240B) and the trim panel substrate 202 (including the aperture 230) are any moldable vehicle interior materials, such as plastics. The molded stakes 240A, 240B, in particular, may be made using commercially available expandable cavity tooling.

Figure 4:
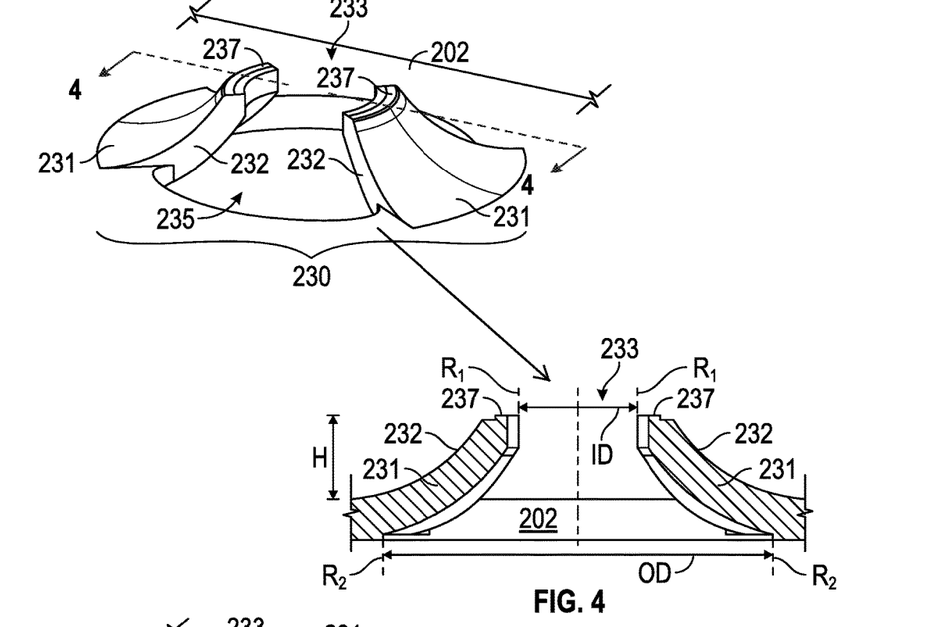
FIGS. 4 and 5 each provide perspective and cross-sectional illustrations of apertures of the joining arrangements.
Figure 5:
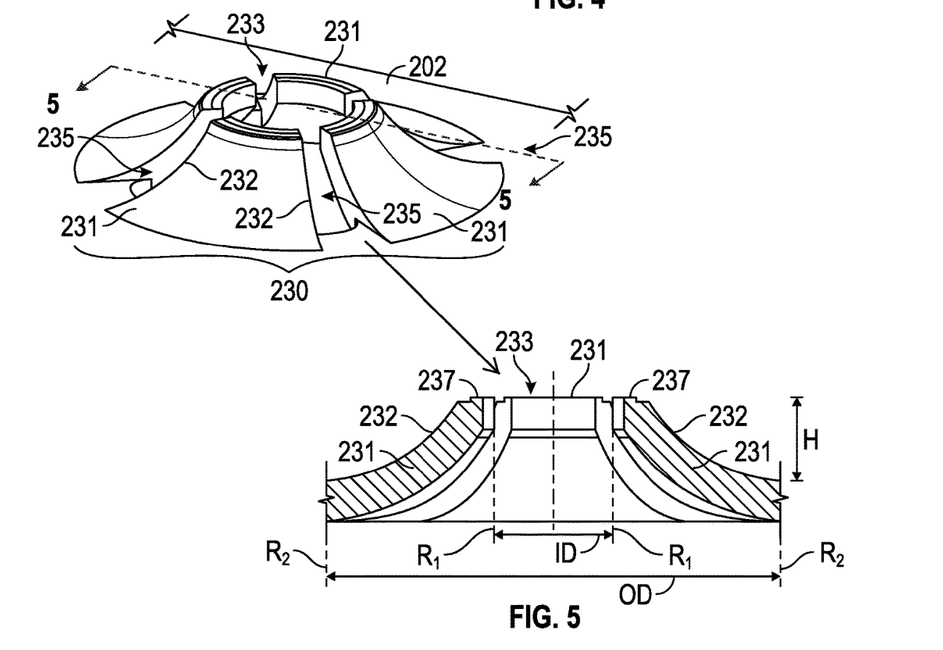

FIG. 4 is a cross-section illustration of an aperture 230 taken along line 4-4, and FIG. 5 is a cross-section illustration of an aperture 230 taken along line 5-5. In FIG. 4, the aperture is illustrated having two fingers 231, while in FIG. 5, the aperture is illustrated having four fingers. Each aperture 230 has a central opening 233 that is generally circular in shape with respect to a central axis (dashed line) that is normal to the surface of trim panel substrate 202. Each finger 231 circumferentially surrounds a portion of the central opening 233 and is defined by an inner radius $R_1$, an outer radius $R_2$, and radially-extending lateral sides 232. (Note $R_1$ is therefore coincident with the circumference of central opening 233, thus defining an inner diameter "ID".) Each finger 231 may therefore be thought of as individual segments of a ring defined by $R_1$ and $R_2$. At $R_1$, each finger 231 terminates at the central opening 233. At $R_2$, each finger terminates as it merges with the bulk mass of the trim panel substrate 202. (Note therefore that the entire aperture is circumscribed by an outer diameter "OD", which is coincident with $R_2$.)

As initially noted above, each finger 231 extends outwardly, such that at its $R_1$ terminus, it extends a height (H) outward from the backside surface of the trim panel substrate 202. Each finger may curve outward, progressing (from $R_2$ to $R_1$) at smoothly increasing angles of outward extension, as illustrated. Alternatively, such outward extension may be more or less linear. Due to the outward extension of the fingers 231, either curved or otherwise, the fingers 231 are flexible so as to be temporarily deformable outwardly with the application of a force, which upon such temporary deformation results in a simultaneous increase of both $R_1$ and H. Separating each finger 231 from a (circumferentially) adjacent finger is a radially-extending (from $R_1$ to $R_2$) gap space 235, whose circumferential dimensions depend on the number and sizing of fingers 231. For example, the gap space 235 in FIG. 4 is much larger (circumferentially) than the gap space 235 in FIG. 5, given that FIG. 5 illustrates twice as many fingers 231. For the purpose of abutting against a molded stake 240A, 240B, each finger 231 includes, extending radially outwardly from its $R_1$ terminus, an outer planar surface 237. Outer planar surface 237 may have a radial dimension that is between about 20% and about 80% of $R_1$, such as about 35% and 65% of $R_1$. Moreover, the absolute values of $R_1$, $R_2$, and H should not be considered limiting on the present disclosure and will vary from application to application, but each (independently) may generally be from about 1 mm to about 50 mm, such as about 5 mm to about 25 mm.

Figure 6A:
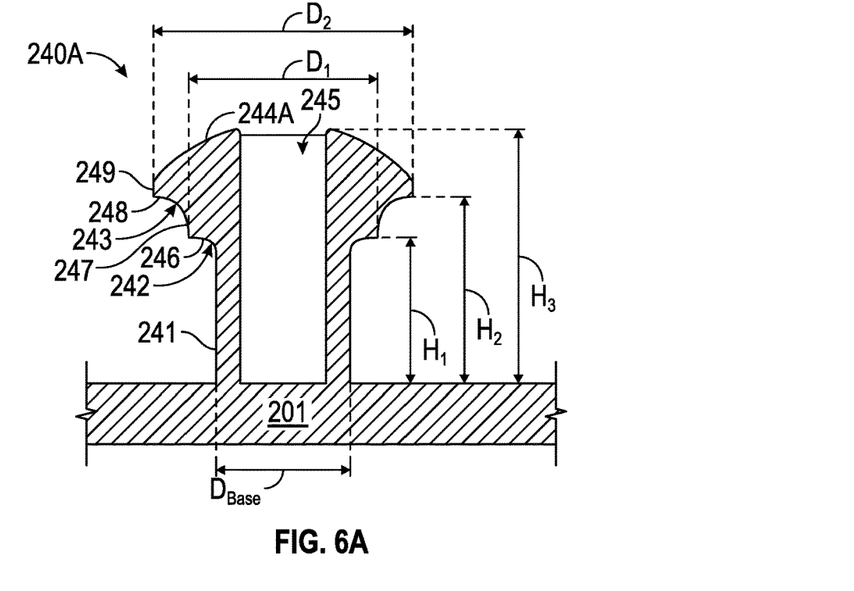
FIGS. 6A and 6B are cross-sectional illustrations of two different molded stake embodiments.
Figure 6B:
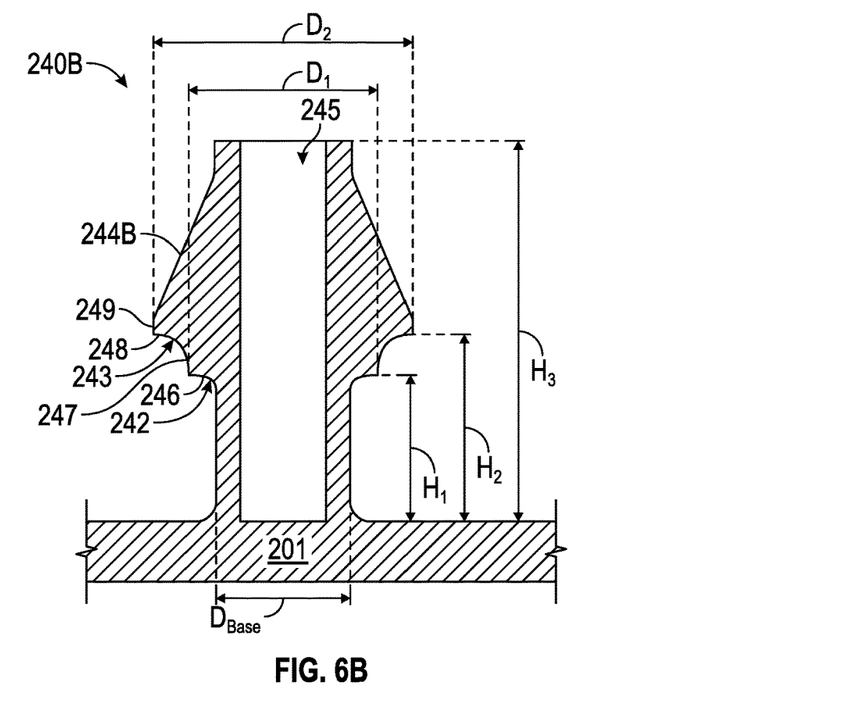

FIGS. 6A and 6B provide cross-sectional illustrations of the molded stakes 240A and 240B, respectively. Regardless of embodiment, each molded stake 240A, 240B includes a cylindrical base portion 241 that extends outwardly from the outward-facing surface of interior trim component 201. The base portion 241 has a diameter $D_{Base}$, and extends to a height $H_1$ outwardly from the interior trim component 201. Outwardly from the base portion 241 is a first shelf portion 242, which includes an inward-facing annular surface 246 beginning at $H_1$. The first shelf portion 242 extends outwardly from $H_1$ to a height $H_2$ outwardly from the interior trim component 201. The first shelf portion also has radial surface 247 defining a larger diameter $D_1$ with respect to the diameter $D_{Base}$. Outwardly from the first shelf portion 242 is a second shelf portion 243, which includes an inward-facing annular surface 248 beginning at $H_2$. The second shelf portion 243 extends outwardly from $H_2$ and merges with a respective distal surface 244A (for molded stake 240A), 244B (for molded stake 240B). The first shelf portion has a larger diameter $D_1$ with respect to the diameter $D_{Base}$. The second shelf portion 243 also has radial surface 249 defining a larger diameter $D_2$ with respect to the diameter $D_1$. It should be appreciated that the base portion 241, may curve or slope gradually into the inward-facing annular surface 246, and the radial surface 247 may slope or curve gradually into the inward-facing annular surface 248. The shelf portions 242, 243 may be fabricated on the stakes 240A, 240B using commercially-available radial tooling. Radial surface 247 functions to provide localization and radial surface 249 functions to ensure positive retention of the joining arrangement.

At $H_2$, and extending outwardly to $H_3$, which is the total height of respective molded stake 240A, 240B, the radial surface at $D_2$ merges into the respective distal surface 244A, 244B. For molded stake 240A, distal surface 244A is configured in substantially a dome shape. For molded stake 240B, distal surface 244B is configured in substantially a truncated cone shape. Regardless of embodiment, each molded stake 240A, 240B, at height $H_3$, opens into a hollow interior core 245 that extends inwardly from $H_3$ down through the shelf portions 242, 243, the base portion 241, and terminating at the interior trim component 201. Moreover, the absolute values of $D_{Base}$, $D_{1-2}$, and $H_{1-3}$ should not be considered limiting on the present disclosure and will vary from application to application, but each (independently) may generally be from about 1 mm to about 50 mm, such as about 5 mm to about 25 mm.

Figure 7A:
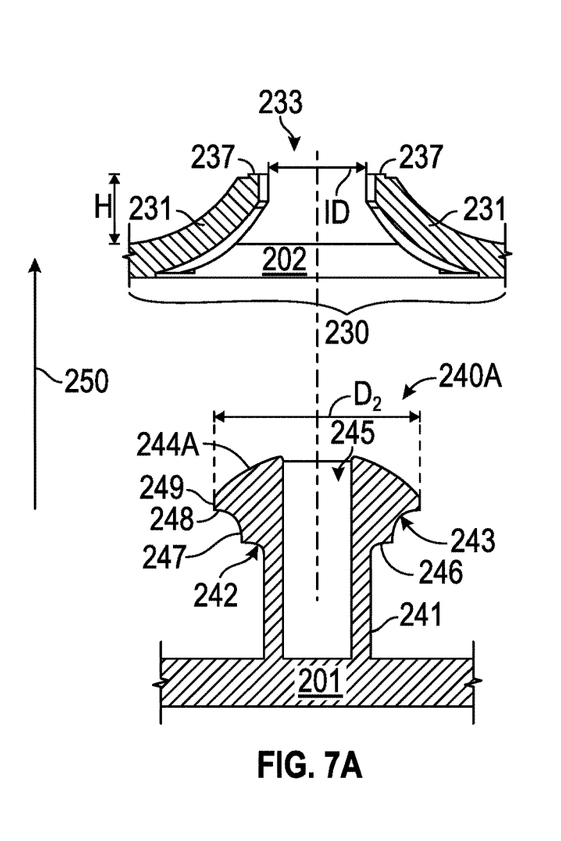
FIGS. 7A and 7B illustrate the two different molded stake embodiments of FIGS. 6A and 6B as they approach an aperture as illustrated in FIGS. 4 and 5, for eventual insertion through the aperture.
Figure 7B:
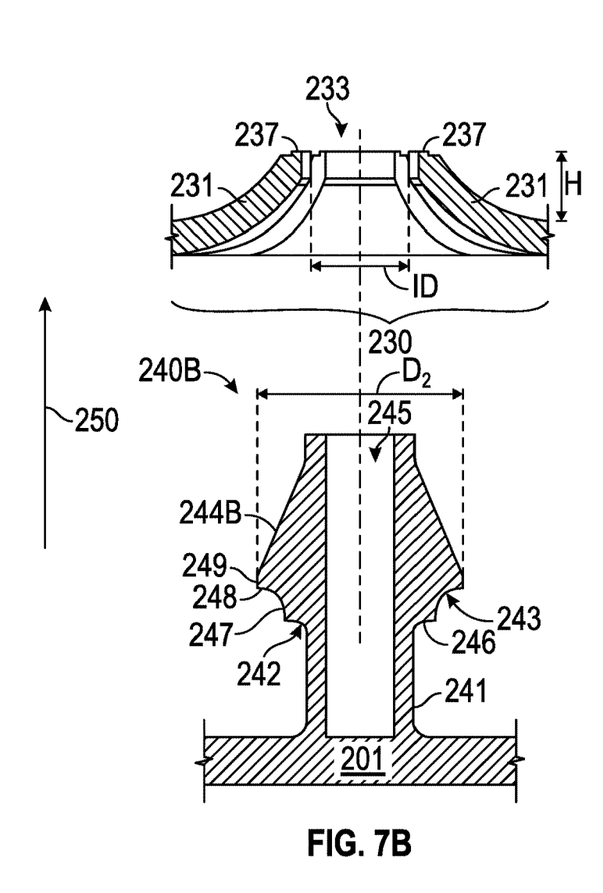

FIG. 7A illustrates molded stake 240A as it approaches an aperture 230, and FIG. 7B illustrates molded stake 240B as it approaches an aperture 230. As shown, the diameter $D_2$ of the second shelf portion 243 of each molded stake 240A, 240B exceeds the inner diameter ID of the aperture 230. As noted above, however, each finger 231 is flexible so as to be temporarily deformable. As such, when each molded stake 240A, 240B is urged against the fingers 231 along the central axis in the direction of arrow 250 (i.e., outwardly), each finger 231 deforms in order to increase ID and H of the aperture 230. This deformability allows each molded stake 240A, 240B to pass through the central opening 233 in the direction of arrow 250. Once through, and the force against the fingers 231 subsides, fingers 231 return to their original, non-deformed position, and the inward-facing annular surface 248 of the second shelf portion 243 may abuttingly come to rest against the outer planar surface 237 of each finger 231. Note that the curved shape of distal surface 244A and the conical shape of distal surface 244B allows for gradual and increasing deformation of the fingers 231 as the respective molded stake 240A, 240B is urged through the central opening 233 of aperture 230, until the maximum diameter $D_2$ is reached at the radial surface 249 of second shelf portion 243.

Figure 8A:
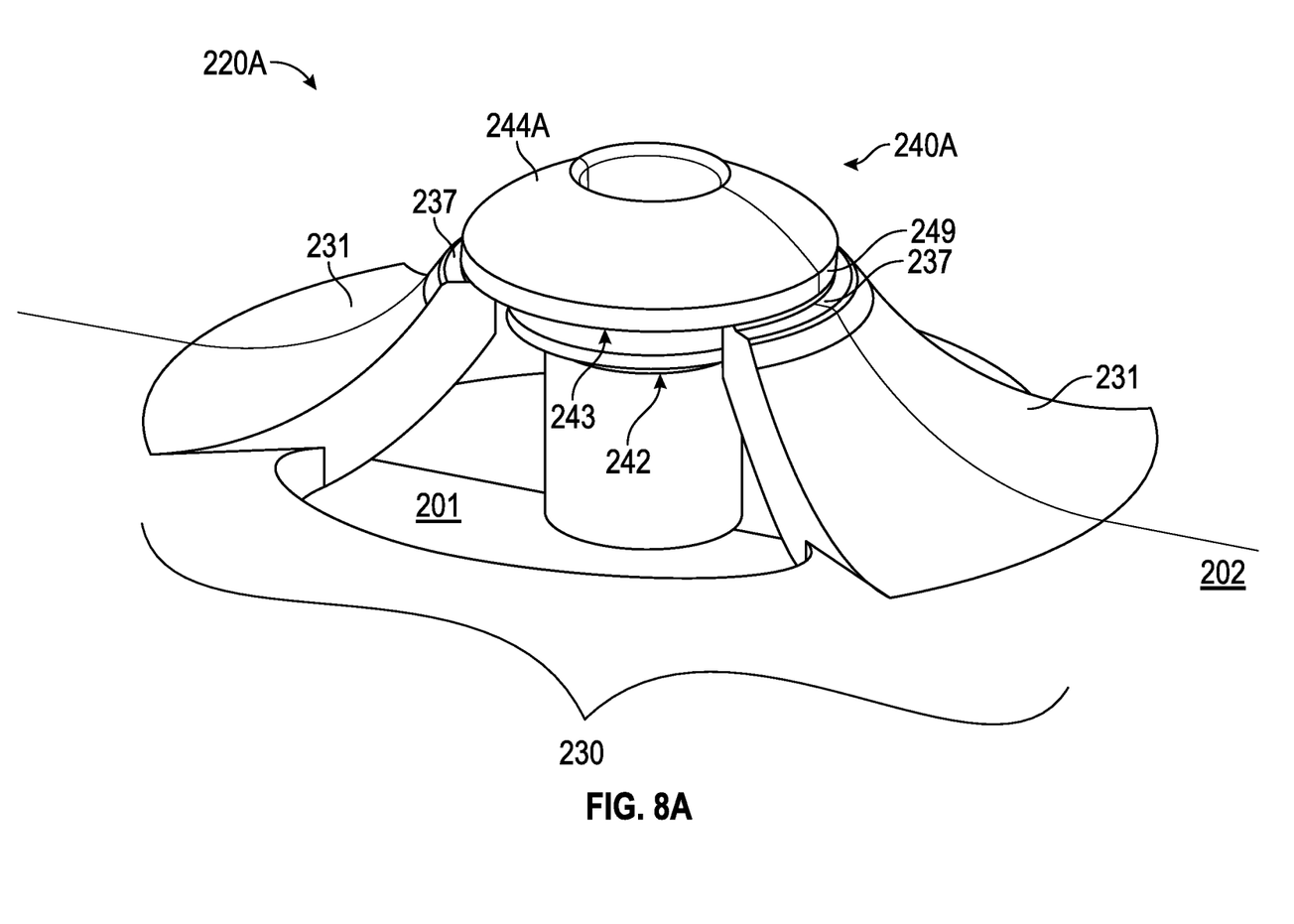
FIGS. 8A, 9A, and 10A provide perspective, perspective/cross-sectional, and cross-section views, respectively, of the molded stake of FIG. 6A inserted and secured within the aperture of FIGS. 4 and 5.
Figure 8B:
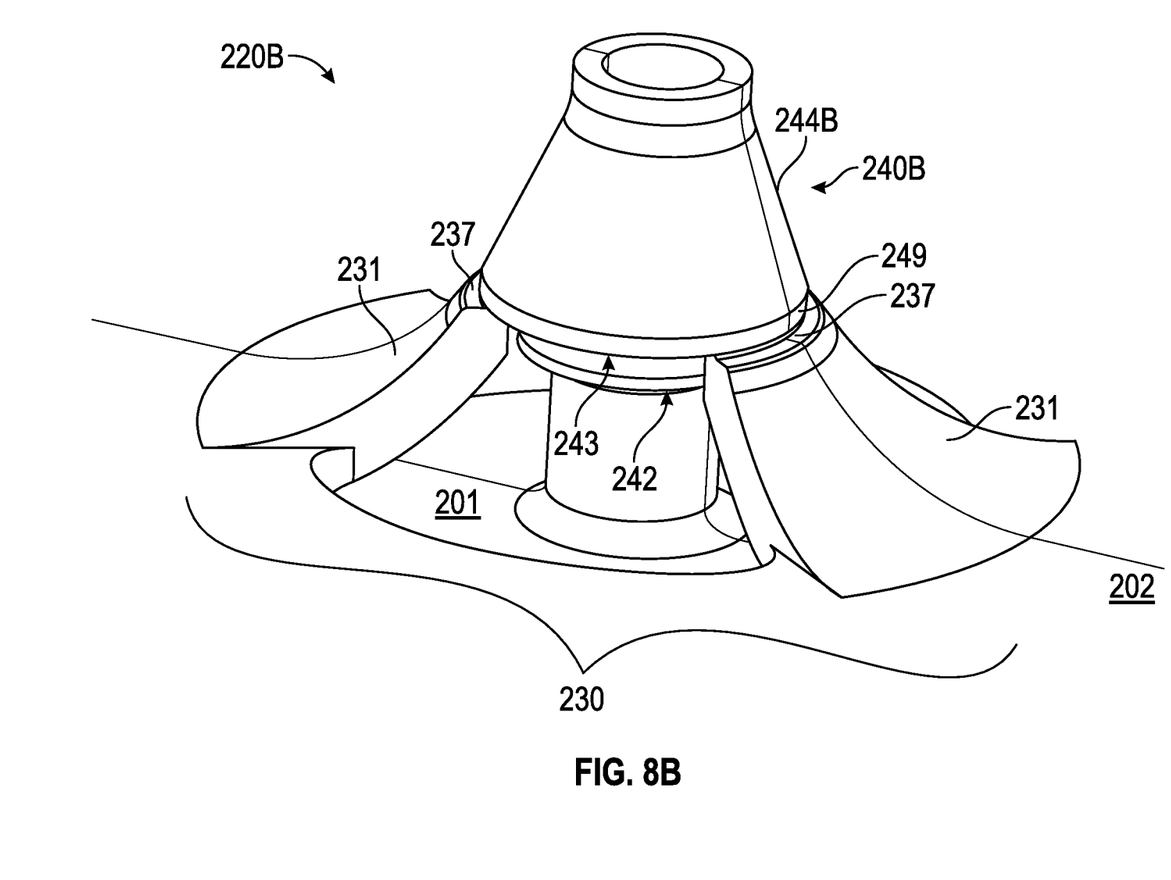
FIGS. 8B, 9B, and 10B provide perspective, perspective/cross-sectional, and cross-section views, respectively, of a molded stake of FIG. 6B inserted and secured within the aperture of FIGS. 4 and 5.
Figure 9A:
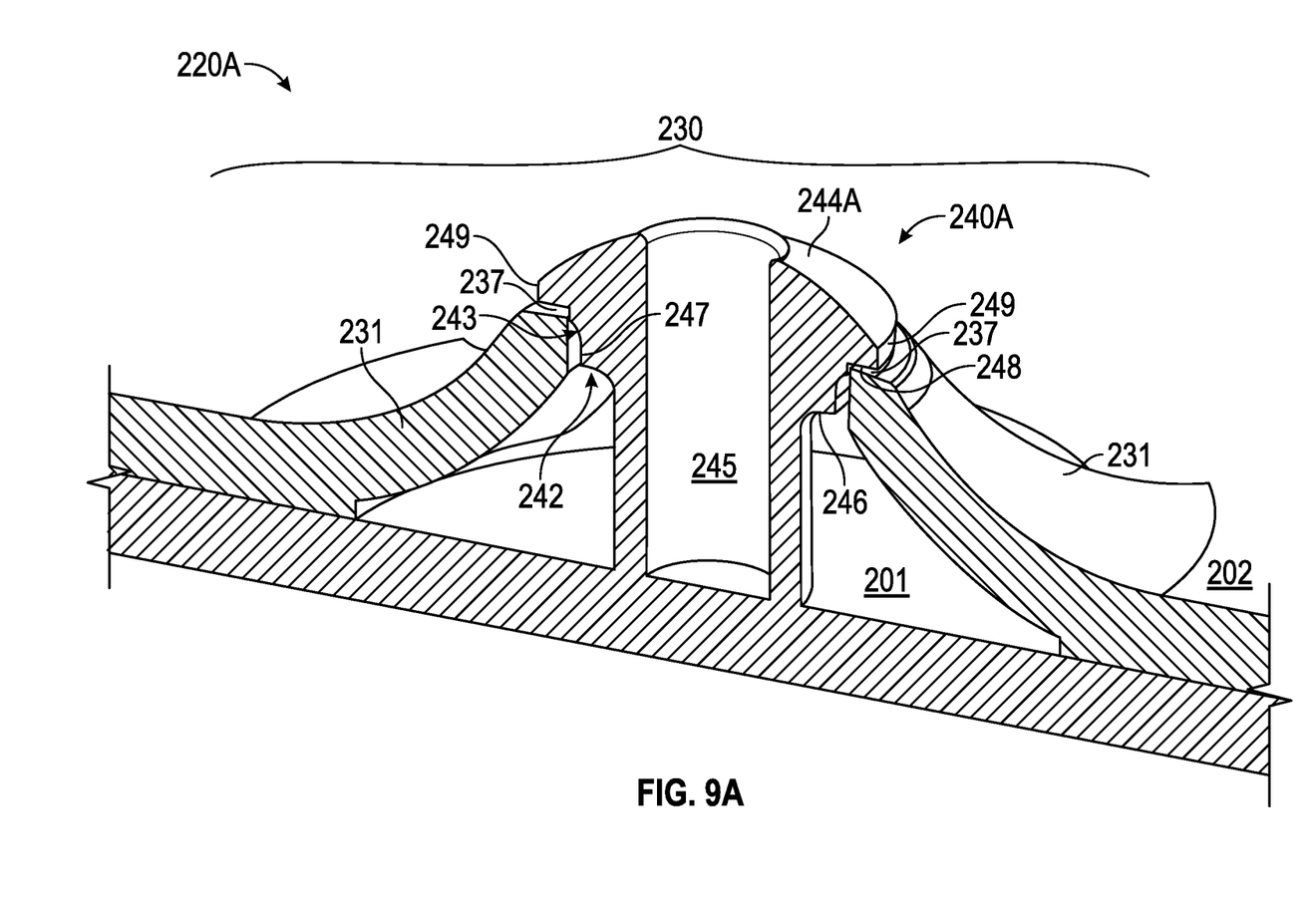
Figure 9B:
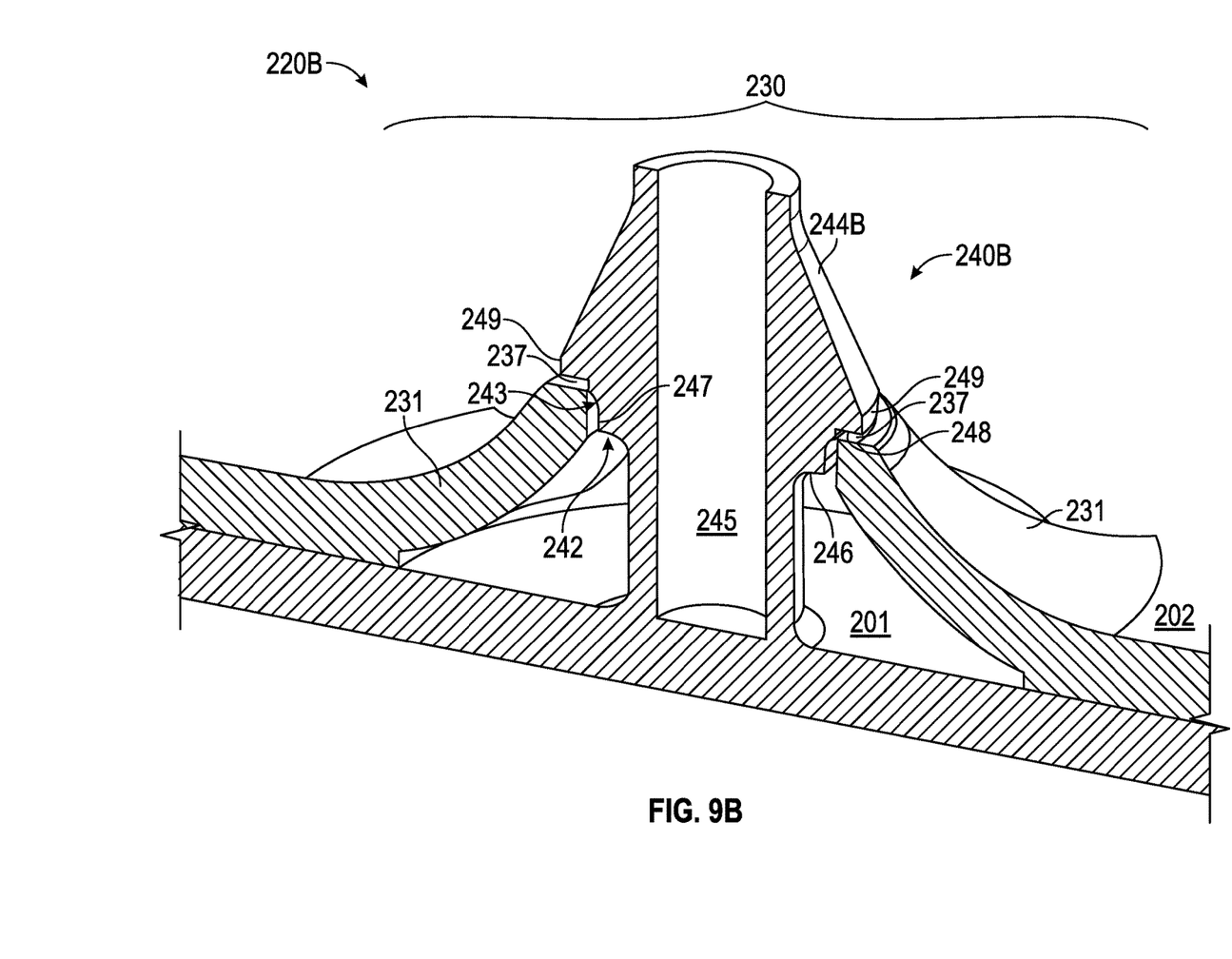
Figure 10A:
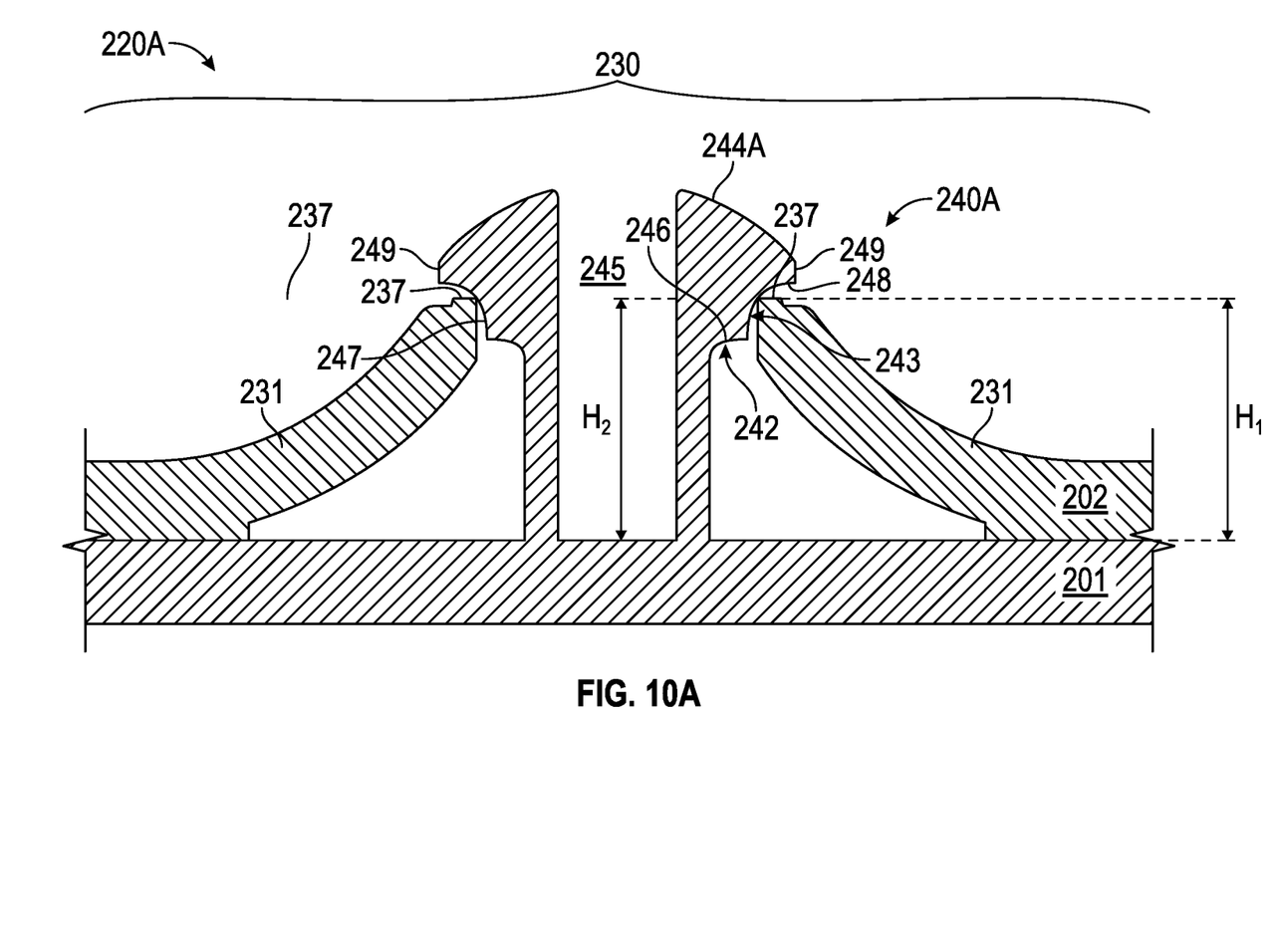
Figure 10B:
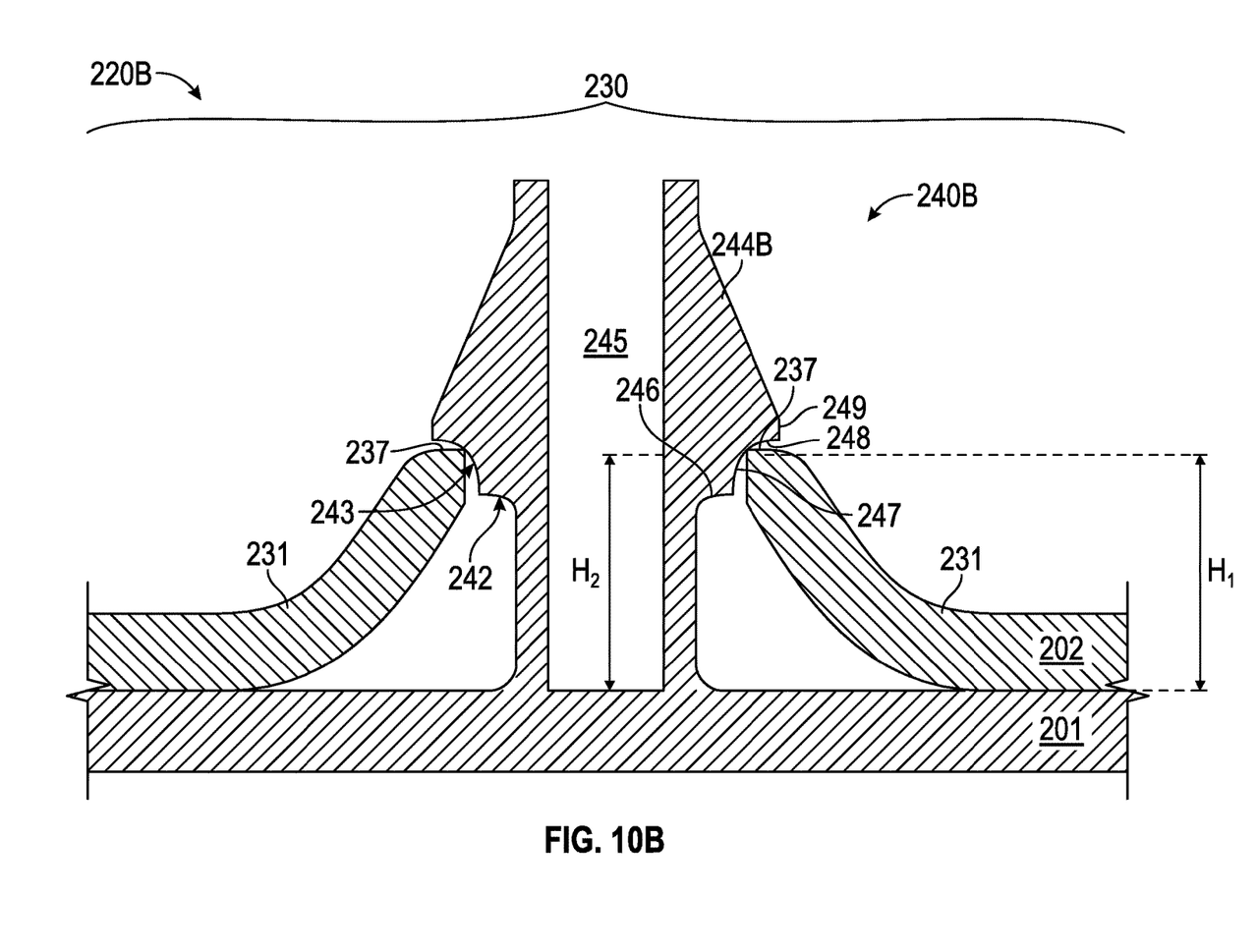

FIGS. 8A, 9A, and 10A provide perspective, perspective/cross-sectional, and cross-section views, respectively, of a molded stake 240A inserted and secured within an aperture 230; FIGS. 8B, 9B, and 10B provide perspective, perspective/cross-sectional, and cross-section views, respectively, of a molded stake 240B inserted and secured within an aperture 230. As shown in each of these Figures, the respective molded stake 240A, 240B has been inserted into the aperture far enough that the inward-facing annular surface 248 of the second shelf portion 243 abuts and rests against the outer planar surface 237 of the fingers 231. The fingers 231 resist the withdrawal of the molded stake 240A, 240B from the aperture by virtue of this abutment: that is, any inward force pulling on the stake 240A, 240B would cause the fingers to compress both inwardly with respect to the central axis but also radially inwardly against the radial surface 247 of the first shelf portion 242, thus preventing any substantial deformation of the fingers 231 that would allow the stake 240A, 240B to pass inwardly back through the central opening 233. As further illustrated in these Figures, the outward-facing surface of the interior trim component 201 is abutting against the inward-facing surface of the trim panel substrate 202. This may be accomplished by providing the fingers 231 with a height H that substantially equates with the height $H_2$ where the inward-facing annular surface 248 is positioned. In this manner, using a plurality of joining arrangements 220A, 220B spread across the surface area (for example, spaced apart from one another by about 30 mm to about 70 mm, depending on the application) of the interior trim component 201 and the trim panel substrate 202 (particularly along the peripheries thereof), the interior trim component 201 may be closely secured with the trim panel substrate 202 for forming the final interior trim assembly.

Figure 11:
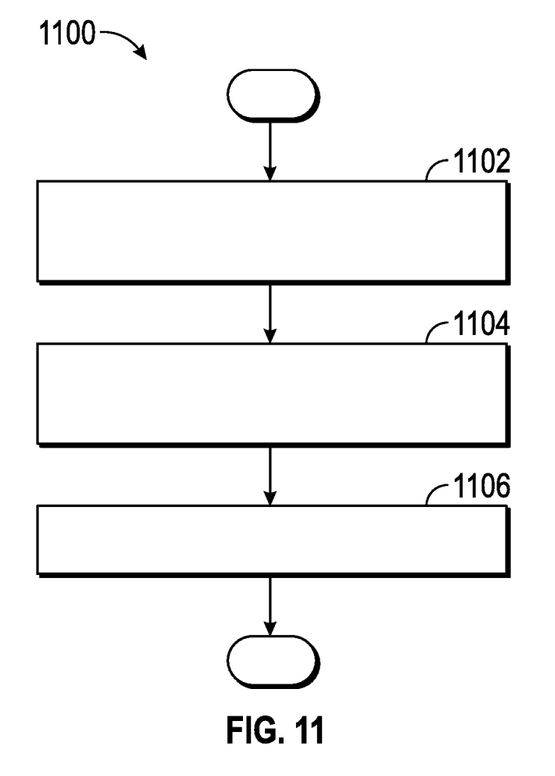
FIG. 11 is a flowchart illustrating a method for joining in accordance with some embodiments of the present disclosure, which may employ any of the joining arrangements of the foregoing Figures.

FIG. 11 is a flowchart illustrating a method 1100 for joining in accordance with embodiments of the present disclosure. In a first step 1102, the method 1100 includes providing an interior trim component 201 with a plurality of stakes, formed as described above with regard to FIGS. 6A and/or 6B. In a second step 1104, the method 1100 includes providing a trim panel substrate with a plurality of apertures, formed as described above with regard to FIGS. 4 and 5. Further, in a third step 1106, the method 1100 includes inserting the stakes through the apertures, in the manner described above with regard to FIGS. 7A and/or 7B. The use of "first," "second," and "third," with regard to the steps does not imply any particular order of performing the steps. Moreover, in other embodiments, more steps may be performed, or fewer steps may be performed.

As used in the present disclosure, the term "about" implies a variance of 10% of the stated value in an embodiment, or a variance of 5% of the stated value in another embodiment. As further used in the present disclosure, terms such as "substantially equal," "substantially equivalent," "substantially the same," and the like imply a relative variance between the two stated values of 10% in an embodiment, or a relative variance between the two stated values of 5% in another embodiment.

While at least one exemplary joining arrangement has been presented in the foregoing detailed description of the invention, it should be appreciated that a vast number of variations exist. It should also be appreciated that the exemplary joining arrangement or exemplary joining arrangements are only examples, and are not intended to limit the scope, applicability, or configuration of the invention in any way. Rather, the foregoing detailed description will provide those skilled in the art with a convenient road map for implementing an exemplary joining arrangement of the invention. It being understood that various changes may be made in the function and arrangement of elements described in an exemplary joining arrangement without departing from the scope of the invention as set forth in the appended claims.

What is claimed is:

1. A joining arrangement comprising:
    a stake extending outward from a surface of a first substrate or panel, wherein the stake comprises: (1) a base portion in physical contact with the first substrate or panel and extending outwardly from the surface of the first substrate or panel, the base portion having a first width, (2) a first shelf portion in physical contact with the base portion and extending outwardly from the base portion, the first shelf portion having a second width that is greater than the first width, the first shelf portion comprising a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion comprising a second, inward-facing annular surface adjacent to the first radial surface and a second, radially-facing radial surface adjacent to the second annular surface, and (4) a distal surface adjacent to and extending outwardly from the second annular surface of the second shelf portion; and
    an aperture formed in a second substrate or panel, wherein the aperture comprises a plurality of spaced-apart fingers that circumscribe a central opening, wherein each finger of the plurality of fingers extends outwardly from a surface of the second substrate or panel, wherein each finger of the plurality of fingers comprises an outer planar surface adjacent to the central opening, and wherein each finger of the plurality of fingers is deformable outwardly.

2. The joining arrangement of claim 1, wherein no portion of the first substrate or panel is in physical contact with any portion of the second substrate or panel.

3. The joining arrangement of claim 1, wherein the stake is inserted through the aperture such that a portion of the stake is in physical abutting contact with the portion of the aperture.

4. The joining arrangement of claim 3, wherein the portion of the stake comprises the second annular surface of the second shelf portion, and wherein the portion of the aperture comprises the outer planar surfaces of the plurality of fingers.

5. The joining arrangement of claim 1, wherein the aperture comprises three or more fingers.

6. The joining arrangement of claim 5, wherein the aperture comprise four or more fingers.

7. The joining arrangement of claim 1, wherein the distal surface is configured in substantially a dome shape.

8. The joining arrangement of claim 1, wherein the distal surface is configured in substantially a truncated cone shape.

9. The joining arrangement of claim 1, wherein an outwardly extending height of the plurality of fingers is substantially the same as a height of the second shelf portion above the surface of the first substrate or panel.

10. The joining arrangement of claim 1, wherein the base portion is substantially cylindrical and wherein the central opening is substantially circular.

11. A method for joining a first substrate or panel with a second substrate or panel, wherein the method comprises the steps of:
    on the first substrate or panel, providing a stake extending outward from a surface of the first substrate or panel, wherein the stake comprises: (1) a base portion in physical contact with the first substrate or panel and extending outwardly from the surface of the first substrate or panel, the base portion having a first width, (2) a first shelf portion in physical contact with the base portion and extending outwardly from the base portion, the first shelf portion having a second width that is greater than the first width, the first shelf portion comprising a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion comprising a second, inward-facing annular surface adjacent to the first radial surface and a second, radially-facing radial surface adjacent to the second annular surface, and (4) a distal surface adjacent to and extending outwardly from the second annular surface of the second shelf portion;
    on the second substrate or panel, providing an aperture formed in the second substrate or panel, wherein the aperture comprises a plurality of spaced-apart fingers that circumscribe a central opening, wherein each finger of the plurality of fingers extends outwardly from a surface of the second substrate or panel, wherein each finger of the plurality of fingers comprises an outer planar surface adjacent to the central opening, and wherein each finger of the plurality of fingers is deformable outwardly; and urging the distal surface of the stake against the plurality of fingers of the aperture so as to outwardly deform the plurality of fingers.

12. The method of claim 11, further comprising passing an entirety of the distal surface and an entirety of the second radial surface of the stake through the central opening of aperture.

13. The method of claim 12, further comprising abutting the second annular surface of the stake against the outer planar surfaces of the plurality of fingers of the aperture.

14. The method of claim 11, wherein the aperture comprises three or more fingers.

15. The method of claim 14, wherein the aperture comprise four or more fingers.

16. The method of claim 11, wherein the distal surface is configured in substantially a dome shape.

17. The method of claim 11, wherein the distal surface is configured in substantially a truncated cone shape.

18. The method of claim 11, wherein an outwardly extending height of the plurality of fingers is substantially the same as a height of the second shelf portion.

19. The method of claim 11, wherein the base portion is substantially cylindrical and wherein the central opening is substantially circular.

20. A vehicle trim assembly employing a joining arrangement comprising:

a trim component;

a plurality of stakes extending outward from a surface of the trim component in a pattern, wherein each stake of the plurality of stakes comprises: (1) a base portion in physical contact with the trim component and extending outwardly from the surface of the trim component, the base portion having a first width, (2) a first shelf portion in physical contact with the base portion and extending outwardly from the base portion, the first shelf portion having a second width that is greater than the first width, the first shelf portion comprising a first, inward-facing annular surface and a first, radially-facing radial surface adjacent to the first annular surface, (3) a second shelf portion in physical contact with the first shelf portion and extending outwardly from the first shelf portion, the second shelf portion having a third width that is greater than the second width, the second shelf portion comprising a second, inward-facing annular surface adjacent to the first radial surface and a second, radially-facing radial surface adjacent to the second annular surface, and (4) a distal surface adjacent to and extending outwardly from the second annular surface of the second shelf portion;

a trim panel substrate; and a plurality of apertures formed in the trim panel substrate in the pattern, wherein each aperture of the plurality of apertures comprises a plurality of spaced-apart fingers that circumscribe a central opening, wherein each finger of the plurality of fingers extends outwardly from a surface of the trim panel substrate, wherein each finger of the plurality of fingers comprises an outer planar surface adjacent to the central opening, and wherein each finger of the plurality of fingers is deformable outwardly, wherein an outwardly extending height of the plurality of fingers is substantially the same as a height of the second shelf portion above the surface of the trim component, and wherein each stake is inserted through a respective aperture such that the second annular surface of the second shelf portion of each stake is in physical abutting contact with the outer planar surfaces of the plurality of fingers of its respective aperture, such that the trim component is held in abutting physical contact with the trim panel substrate.

* * * * *